Feb. 10, 1931.  C. W. CHESTER  1,791,795
AIRPLANE GUN MOUNTING
Filed Sept. 25, 1928  3 Sheets-Sheet 1
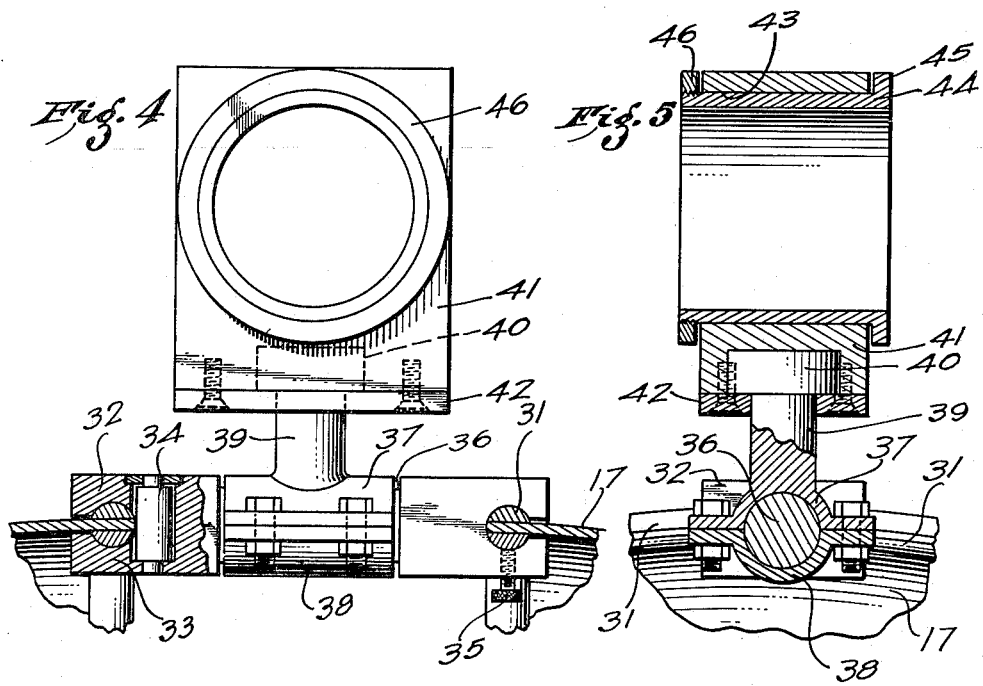
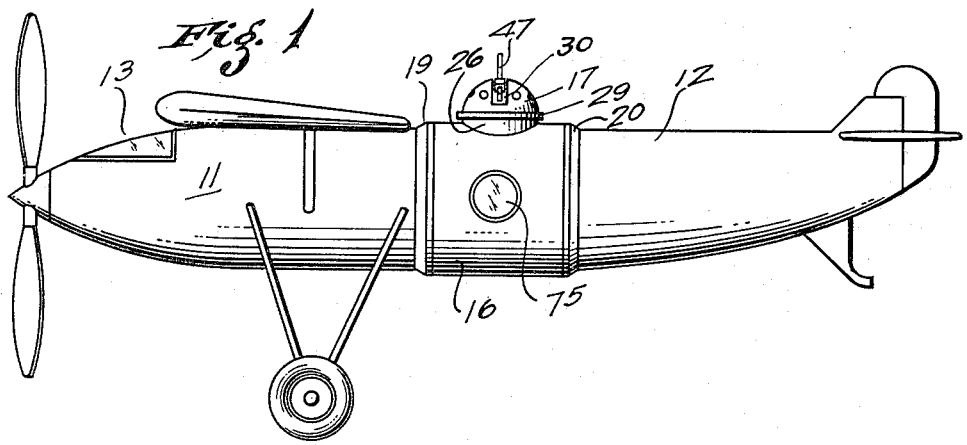
INVENTOR
Carroll W. Chester
By John Flam
ATTORNEY Feb. 10, 1931. C. W. CHESTER 1,791,795
AIRPLANE GUN MOUNTING
Filed Sept. 25, 1928 3 Sheets-Sheet 2
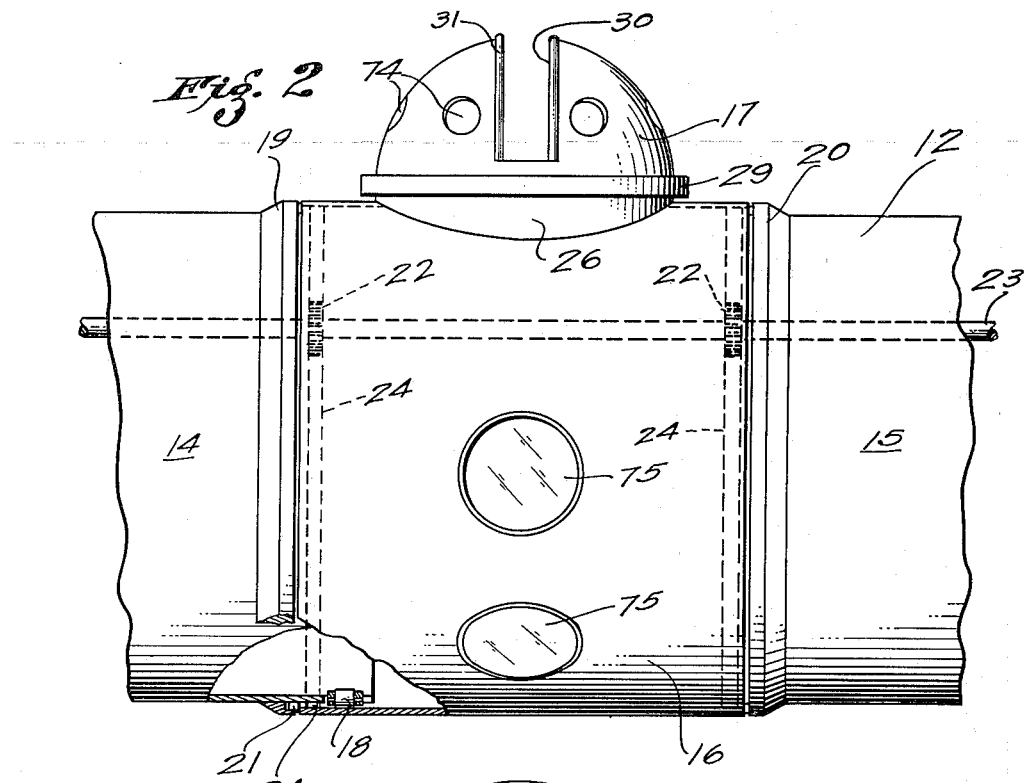
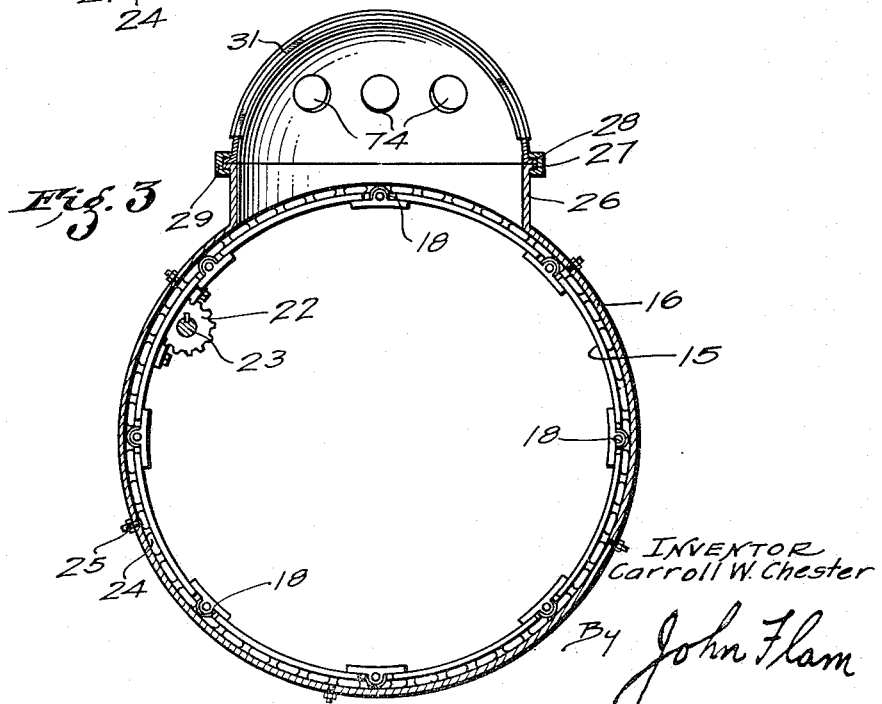

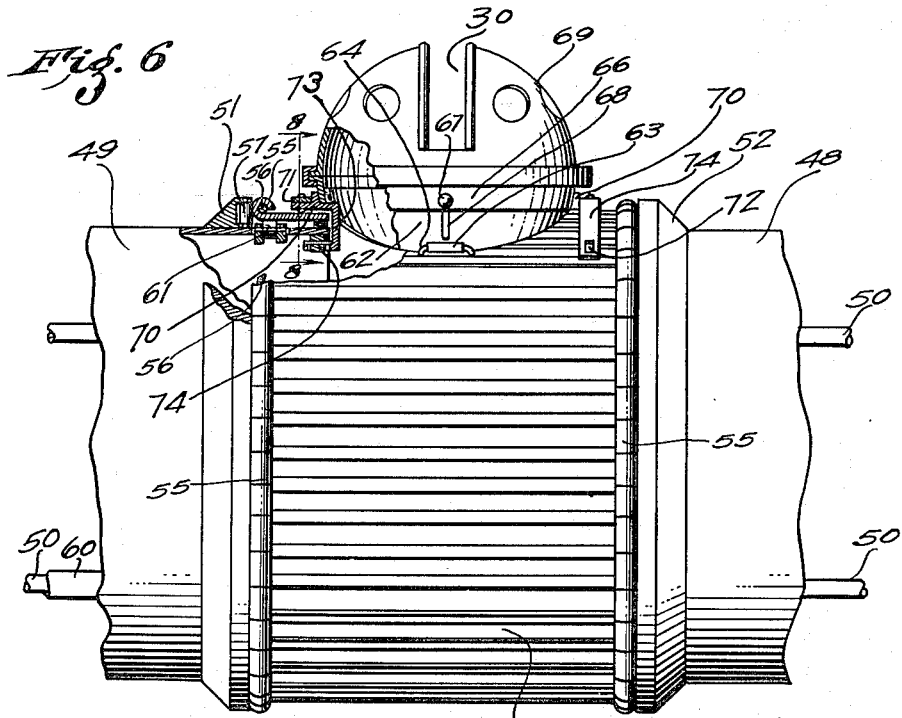

Patented Feb. 10, 1931

1,791,795

UNITED STATES PATENT OFFICE

CARROLL W. CHESTER, OF LOS ANGELES, CALIFORNIA

AIRPLANE GUN MOUNTING

Application filed September 25, 1928. Serial No. 308,220.

This invention relates to airplanes, and particularly to combat planes that carry armament.

It is now quite common to provide a machine gun for combat service on airplanes, which can be operated by a person in the fuselage of the plane. The gun mounting is usually such that it can be swung about one or more axes, as by the aid of a swivelled turret. However, such a mounting gives but limited freedom of action; for example, when the plane loops or turns upside down (which action is often voluntarily resorted to in combat, or is the inevitable consequence of the conditions imposed upon the plane), the ordinary gun mount does not permit of its effective use except in a downward direction, and it is ineffective against attack from above.

It is an object of my invention to provide a gun mounting on an airplane that is capable of being trained on an object either above or below the plane, and independently of the position of the plane in the air. Thus it is possible for the pilot to alter the position of his plane, while yet permitting the gunner to maintain his sight on the enemy.

I am enabled to accomplish this result by providing a mounting for the gunner that encompasses the fuselage of the plane and that can be moved completely around the entire perimeter thereof, and about the axis of the fuselage. This mounting can be made either of rigid ring form (in case the fuselage is circular in section) or else it can be made of parts that can conform to a shape of the fuselage if it departs from the circular; for example, as by the aid of a series of plates or strips conforming to the body of the fuselage. This mounting can carry a rotatable turret structure upon which the gun is supported. It is thus another object of my invention to provide a mounting that entirely encompasses the fuselage, and that can be moved with respect to the fuselage so as to carry the turret of the gun to any desired angular position with respect to the longitudinal axis of the plane.

My invention possesses many other advantages, and has other objects which may be made more easily apparent from a consideration of several embodiments of my invention. For this purpose I have shown a few forms in the drawings accompanying and forming part of the present specification. I shall now proceed to describe these forms in detail, which illustrate the general principles of my invention; but it is to be understood that this detailed description is not to be taken in a limiting sense, since the scope of my invention is best defined by the appended claims.

Referring to the drawings:

Figure 1 is an outline picture of an airplane showing my gun mounting;

Fig. 2 is an enlarged fragmentary view, partly in section, of that portion of the fuselage of the plane that carries the gun mounting;

Fig. 3 is an enlarged cross section of the fuselage taken through the gun mounting;

Fig. 4 is an enlarged detail view of the swivel support for the gun itself;

Fig. 5 is an enlarged cross section of the swivel mounting;

Fig. 6 is a fragmentary view, partly in section, of a fuselage of non-circular form, utilizing another embodiment of my gun mounting;

Fig. 7 is a cross section of the fuselage shown in Fig. 6, taken through the gun mounting; and Fig. 8 is an enlarged detail sectional view taken along plane 8—8 of Fig. 6.

In the form of my invention disclosed in Figs. 1 to 8 inclusive, I show an airplane 11 of conventional form. Since the details of the airplane structure form no part of my present invention, this airplane will not be described in full, it being sufficient to point out that the plane has a fuselage portion 12 and a compartment 13 for the pilot, together with other essential features, such as a propeller, wings, and landing gear.

In order to practice my invention, it is essential that the fuselage be made in connected but spaced sections, so as to leave a clear space for the gun mounting between the sections. Referring more particularly to Fig. 2, the fuselage 12 is shown as having the front section 14 and the rear section 15. Between these two sections is located a removable ring or shell 16. This ring or shell in the present form is shown as substantially circular in cross section and carrying a gun turret 17. The ring or shell 16 is so arranged that it can be angularly adjusted on the fuselage 12, whereby the turret 17 is correspondingly angularly adjustable with respect to the longitudinal axis of the plane 11. For this purpose the edges of the ring or shell 16 overlap the edges of the fuslage sections 14 and 15, as clearly disclosed in Fig. 2. It is mounted for rotation on these fuselage sections. Thus the fuselage sections each has a plurality of rollers 18, which contact with the inner surface of the ring 16. In order to restrict axial movement of the ring 16, there may be provided the flanges 19 and 20 on the fuselage sections 14 and 15 respectively. Roller bearings 21 can be provided on the edges of these flanges to prevent frictional forces from binding the ring 16.

The mechanism for imparting movement to the ring 16 on the fuselage will now be described. This movement can be accomplished either by manual power, or by the aid of a motor. In the present instance I show pinions 22, fastened on a rotatable shaft 23, which extends longitudinally through the fuselage 12 and which can be rotated in any desired manner. These pinions are arranged to mesh with a pair of sprocket chains 24 respectively fastened adjacent the inside edges of the ring or shell 16, as by the aid of the bolts 25. Upon rotation of shaft 23, gears 22 are correspondingly rotating and as they mesh with links of the chains 24, the ring 16 is given an angular movement.

If desired, one or more windows, such as 75, can be formed in the ring or shell 16 to provide visibility for the gunner. These windows are shown of circmular form, but obviously any desired form can be used.

The gunner is intended to be located inside of the ring or shell 16, whereby he can expeditiously manipulate the turret structure 17. This turret structure will now be described.

Extending radially from the axis of ring 16, there is a tubular portion 26 having a flange 27, forming a support for the turret 17. This turret 17 has a corresponding flange 28 resting on flange 27, and rotatable thereon. Axial displacement of the turret with respect to the tubular portion 26 is prevented by a split ring 29, having flanges extending above and below the flanges 27 and 28. The turret is shown as being substantially hemispherical, and as provided with an arcuate slot 30, on the edges of which the gun mounting proper can be moved in an arc.

This turret can also be provided with a series of small windows such as 74. The edges of the slot 30 can be beaded to provide a circular edge 31 as indicated most clearly in Fig. 4, so as to present a smooth curved surface.

The gun support, shown in detail in Figs. 4 and 5, engage these beaded edges 31, and is angularly movable by the operator along these edges, so as to cause the gun to be elevated or depressed as desired, along an arc corresponding to the arc of slot 30. Thus this gun support includes an upper half 32 and a lower half 33, which can be fastened together in any appropriate fashion, and which have contiguous concavities for the accommodation of beads 31. In this structure 32—33, are located a series of roller bearings 34 engaging the edges 31. In this way the support 32—33 can be manually moved without appreciable frictional resistance in the slot 30. It can be held in any desired angular position by the aid of a thumb screw 35 that clamps this support to one of the beaded edges 31. The support 32—33 also carries a pivot shaft 36. This shaft extends in a direction transverse to the slot 30 and is rigidly supported in the support 32—33.

This rigidly supported shaft 36 is encompassed by an angularly adjustable standard 37. This standard 37 is held in place on the shaft 36 by the aid of a bearing cap 38. It has a right angled extension 39 having an enlarged circular head 40. On this head is rotatably mounted a block 41. This block 41 is held against removal by the plate 42 which engages the lower surface of the head 40, and is fastened to the bottom of block 41. The block 41 has a large cylindrical opening 43, through which extends a rotatable bushing 44 that is held in place against axial movement by its flange 45 and a threaded ring 46. Through this bushing 44 the barrel 47 (Fig. 1) of the gun can extend.

The mode of operation of my device is apparent from the foregoing. The gun barrel 47 can be manipulated by the operator inside the fuselage 12. The gun has a number of movements in the support 32—33. First of all, it can be swung about the axis of the head 40 so that the angular position of the gun with respect to the turret 17 can be adjusted. It can also be revolved about the axis of shaft 36, giving another adjustment.

Lastly, the support 32—33 can be moved angularly in the slot 30. In addition to these adjustments the turret 17 can be rotated with respect to the tubular extension 26; and by operation of shaft 23 the ring or shell 16 can be rotated to adjust the angular position of the extension 26 with respect to the fuselage.

Due to these various adjustments, it is possible to keep the gun trained on an object either in front or at the rear of the plane or above or below it, and independent of the position of the plane in the air. This capability of the mechanism to be adjusted to varying conditions of operation of the plane is of great importance. Were it not for these adjustments, the effectiveness of the plane as a combat machine would be very materially hampered and it would lay itself open to ready attack.

In the form just described, the fuselage of the plane is shown substantially as circular. In many instances, the form of the fuselage departs from the circular. In such cases the ring 16 can be made in sections so as to make it readily conformable to the fuselage contour. In the form illustrated in Figs. 6, 7, and 8, the fuselage sections 48 and 49 are shown as ovals. In this form I show a plurality of longérons 50 extending through the sections 48 and 49, which longérons form a part of the structure holding these sections rigidly in spaced position with relation to each other. Both sections also have the flanges 51 and 52 to limit axial movement of the ring structure 53. In this instance the ring structure includes a series of strips 54 extending in a longitudinal direction and having overlapping edges, such as shown at 55 in Fig. 8. Each of the strips 54 has an ear 55' at each end. Through all of the ears at each of said ends, there passes a flexible cable or wire 56 (Fig. 6) in order to hold these strips 54 together. This wire or cable 56 is quite flexible; therefore, as the ring structure 53 is moved angularly with respect to the axis of fuselage sections 48 and 49, these strips 54 can conform to the contour of these sections, as illustrated clearly in Fig. 8. Roller bearings 57 can be provided in the flanges 51 and 52, against which the ears 55' engage.

Angular adjustment of the structure 53 is accomplished in the same manner as before. Fastened to the strips 54 adjacent each edge thereof is the sprocket chain 58. This sprocket chain is engaged by a pinion 59 fastened to a tube 60 rotatable on one of the longérons 50. Roller bearings 61 can also be used, fastened adjacent the inner edges of the fuselage sections 48 and 49, and engaging the inner surfaces of strips 54.

The turret structure is so formed that it may accommodate itself to the ring structure 53, and that it may adjust itself to the varying contour thereof. Thus I utilize a pair of shell 62, each having a depending ear 63 (Fig. 7) by the aid of which each shell may be fastened to a strip 54, as by engaging a handle 64 fastened to the strips. These sections 62 are cut away as shown by the lines 65 (Fig. 7) so as to conform to the contour of the ring structure 53 at its smallest radius of curvature. As the ring structure 53 is angularly moved by the aid of the gear 59, these sections 62, not being in direct mechanical connection with each other, can thus readily accommodate themselves to the varying curvatures of the fuselage section. These shells 62 in turn loosely support a bearing ring 66 as by the aid of rivets or bolts 67. These pass loosely through slots 68 in the sections 62. These slots are arranged so that their axes are central with respect to the width of the ring structure 53, and in line with the ears 63, whereby relative movement of the shell 62 with respect to ring 66 results in pivotal movement of ear 63 on handle 64. Due to the looseness between the rivets 67 and slots 68, it is possible for these sections 62 to accommodate themselves to the varying contour of the fuselage. Upon this ring is supported a turret structure 69 which can be similar in all respects to the turret structure already disclosed in connection with the first form.

In order to insure that the supporting ring will be held in its correct relative position on sections 62, I provide a pair of guides for the ring 66 with respect to the fuselage. Thus, as most clearly shown in Figs. 6 and 8, the ring 66 is provided with a bracket 70 upon which there is supported a leaf spring 71, having its longitudinal axis transverse to that of the fuselage. This spring normally tends to be bowed. They carry at both extremities the rollers 72, which contact with the outer surface of the corresponding fuselage section. These rollers pass through appropriate apertures in the strips 54, as shown most clearly in Fig. 8. Furthermore, the ring 66 also supports defending U-shaped arms 73 that serve to support a roller 74 contacting with the inner surface of the corresponding fuselage section. There are thus three points of contact formed by the three rollers 72 and 73 adjacent the edge of each fuselage section 48 and 49, for positioning the ring 66.

It is apparent that as the ring structure 43 is moved with respect to the fuselage, the springs 72 will accommodate themselves to the contour of the fuselage and will tend to hold the supporting ring 66 in central position.

In order that the operator of the gun may be permitted to manipulate the gun, those portions of the strips 54 which are encompassed by the supporting shells 62 are cut away beneath the turret, so as to leave an aperture in the ring at this point.

The particular details of the gun support can be exactly the same as in Figs. 4 and 5; and this structure disclosed in these figures is immediately applicable to the turret 69 of Figs. 6, 7, and 8.

The operation of this form of my invention is apparent from the foregoing. In the main it is similar to that of the first form. As the plane varies its position in the air, the operator inside the fuselage can maintain the gun mount in any desired relative position by operating the shaft 60 on which gear 59 is fastened, and by turning the turret and the gun on their rotatable supports.

I claim:

1. In combination, an airplane having a fuselage with separated sections, and a gun mount located between the sections, said gun mount including a structure that is mounted on said sections for angular adjustment about an axis longitudinal to the airplane.

2. In combination, an airplane having a fuselage, and a gun mount structure encircling said fuselage and angularly movable with respect to the axis of the fuselage.

3. In combination, an airplane having a fuselage; a gun mount structure encircling said fuselage and movable with respect thereto, and means for adjusting the structure with respect to the fuselage.

4. In a gun mount structure for an airplane, a ring, a turret supported on the ring, means for supporting a gun in the turret, said ring having an axis substantially coincident with the longitudinal axis of the airplane, and means for adjusting the angular position of the ring with respect to the longitudinal axis of the airplane.

5. In a gun mount structure for an airplane having a fuselage, a ring structure encompassing the fuselage and adjustable about the axis of the fuselage, and a turret supported by and communicating with the ring structure.

6. The combination as set forth in claim 5, in which the ring structure includes a series of strips extending in a direction parallel with the fuselage, and means for flexibly connecting the strips together.

7. The combination as set forth in claim 5, in which the turret is rotatable about an axis at an angle to the axis of the ring structure, and with the addition of a swivel support on the turret for the gun.

8. In combination, a fuselage having a pair of sections separated in an axial direction, and a gun mounting structure supported on the adjacent edges of the sections, said structure including a series of strips flexibly connected together and forming a ring structure movable with respect to the fuselage.

9. In combination, a fuselage having a pair of sections separated in an axial direction, and a gun mounting structure supported on the adjacent edges of the sections, said structure including a series of strips flexibly connected together and forming a ring structure movable with respect to the fuselage, and a rotatable turret structure supported on the ring structure.

10. In an airplane gun mount, a rotatable turret having a curved member provided with a slot, a support slidable on the edges of the slot, and a swivel mechanism on said support.

11. The combination as set forth in claim 10, in which the swivel mechanism includes a standard, a shaft extending across the slot for pivotally supporting the standard on an axis at an angle to the axis of the standard, and a block pivotally movable about the axis of the standard.

12. The combination as set forth in claim 9, in which the turret structure includes a pair of separate sections carried by the ring structure, and a supporting ring for the turret adjustably carried by the sections.

13. The combination as set forth in claim 9, in which the turret structure includes a pair of separate sections carried by the ring structure, a supporting ring for the turret adjustably carried by the sections, and in which there is a flexible leaf spring structure attached to each of the sections and arranged to contact with the corresponding edge of the fuselage section for maintaining the sections centralized irrespective of the angular position of the turret structure with respect to the axis of the fuselage.

14. In a gun mount structure for an airplane, a shell adapted to encircle the airplane frame and movable with respect thereto, a turret supported on said shell, and means for supporting a gun in the turret.

15. In a gun mount structure for an airplane, a shell adapted to encircle the airplane frame, a turret supported on the shell, means for supporting a gun in the turret, and means for adjusting the angular position of the shell.

In testimony whereof I have hereunto set my hand.

CARROLL W. CHESTER.